United States Patent [19]
Tanaka

[11] 4,347,551
[45] Aug. 31, 1982

[54] CERAMIC CAPACITOR WITH TERMINALS IN SOCKETS

[75] Inventor: Yukio Tanaka, Tsuruga, Japan

[73] Assignee: Murata Manufacturing Co., Ltd., Japan

[21] Appl. No.: 157,864

[22] Filed: Jun. 9, 1980

[30] Foreign Application Priority Data

Jun. 20, 1979 [JP] Japan .............................. 54-85418[U]

[51] Int. Cl.³ ............................................. H01G 1/14
[52] U.S. Cl. .................... 361/307; 29/25.42; 361/309; 361/321
[58] Field of Search ............... 361/306, 308, 309, 321; 29/25.42

[56] References Cited

U.S. PATENT DOCUMENTS

| | | | |
|---|---|---|---|
| 2,634,315 | 4/1953 | Allison | 361/308 |
| 2,673,972 | 3/1954 | Minnium | 361/308 |
| 3,187,242 | 6/1965 | Schick | 361/308 |
| 3,364,401 | 1/1968 | Rayburn | 361/309 |

FOREIGN PATENT DOCUMENTS

| | | | |
|---|---|---|---|
| 1049008 | 2/1952 | Fed. Rep. of Germany | 361/307 |
| 2801079 | 7/1978 | Fed. Rep. of Germany | 361/307 |

*Primary Examiner*—Elliot A. Goldberg
*Attorney, Agent, or Firm*—Ostrolenk, Faber, Gerb & Soffen

[57] ABSTRACT

A ceramic capacitor arrangement includes a cylindrical ceramic body having a socket formed at each end thereof, and an electrode film deposited on each end of the ceramic body. A terminal pin is pressure-fitted into each socket and is temporarily held therein. A solder bead is deposited on each of the electrode film to secure the terminal pin rigidly in each socket.

7 Claims, 10 Drawing Figures

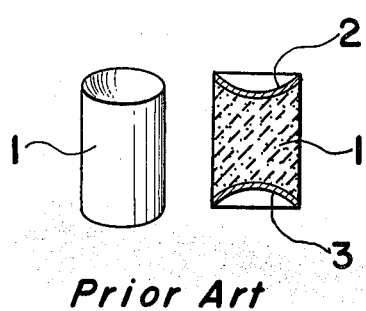
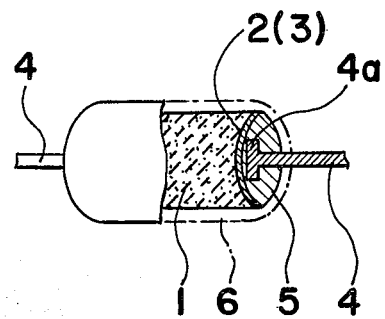
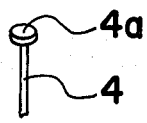
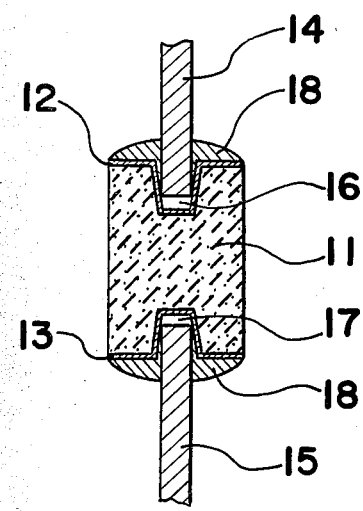
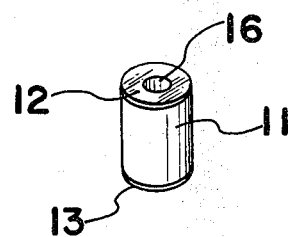

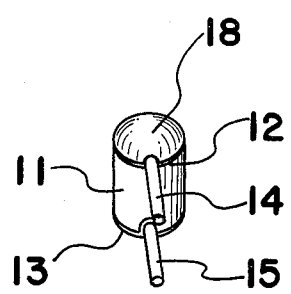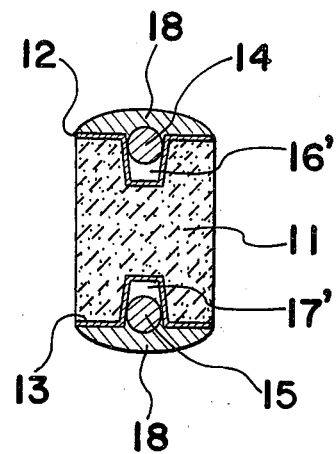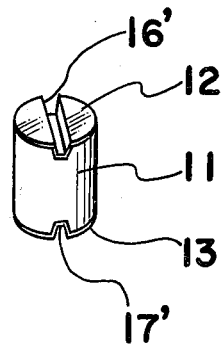

CERAMIC CAPACITOR WITH TERMINALS IN SOCKETS

BACKGROUND OF THE INVENTION

The present invention relates to a capacitor and, more particularly, to an arrangement of a capacitor made of ceramics.

Generally, capacitors of the foregoing type include a ceramic body having two electrodes deposited thereon and two terminal pins extending from the respective electrodes. The manner in which the terminal pins are provided effects the retention of such pins during and after the manufacture of the capacitor.

One conventional capacitor arrangement includes a cylindrical ceramic body 1, as shown in FIGS. 1a and 1b, which has been sintered. Each end of the ceramic body 1 is grinded to form a concave surface on which an electrode film 2 or 3 is deposited. Two terminal pins 4, each having a head portion 4a (FIG. 2) are attached axially to the cylindrical ceramic body 1 at opposite ends thereof with the head portion 4a being held in contact with the concave electrodes 2 and 3, respectively, as shown in FIG. 3. To secure the terminal pins 4 firmly in place and to electrically connect the terminal pins 4 with the respective electrodes 2 and 3, a solder bead 5 is deposited in each of the concave surfaces. Since the head portion 4a of the terminal pin 4 is merely facing the corresponding concave surface, it is necessary to support the terminal pin 4 during the deposition of the solder bead 5. Accordingly, it is difficult to design a machine for manufacturing the capacitor arrangement described above through high speed automation.

Furthermore, when mounting the above described conventional capacitor arrangement onto a circuit board (not shown), or when connecting a lead line (not shown) to it, soldering is generally carried out for such connections. When the soldering is carried out, the heat applied to the terminal pin 4 may undesirably heat the head portion 4a of the terminal pin 4 and melt the solder bead 5. Thus, the terminal pin 4 may undesirably be detached from the ceramic body 1. To prevent such a detachment, the above described capacitor arrangement is further provided with a synthetic resin coating 6 therearound to maintain the solder bead 5 on the concave and to hold the terminal pin 4 in position. However, the employment of the synthetic resin coating 6 not only complicates the manufacturing process, but also produces a floating capacitance and deteriorates temperature characteristics of electrostatic capacitance.

SUMMARY OF THE INVENTION

Accordingly, a primary object of the present invention is to provide an improved ceramic capacitor arrangement enabling a temporary support of the terminal pins before the solder bead is applied.

It is a further object of the present invention to provide a ceramic capacitor arrangement of the above described type which is simple in construction and can readily be manufactured at low cost through a high speed automated manufacturing process.

In accomplishing these and other objects of the invention, a ceramic capacitor arrangement according to the present invention comprises a substantially elongated body made of ceramics having opposite ends. The elongated body is formed with first and second sockets at opposite ends, respectively. Each socket is narrowed in a direction axially inwardly of the body. The opposite ends of the elongated body are deposited with first and second electrode films. The arrangement further comprises first and second terminal pins pressure-fitted into the first and second sockets, respectively, and first and second solder beads deposited on opposite ends of the elongated body, respectively.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIGS. 1a to 3 are drawings which have been already referred to in the foregoing description, FIG. 1a being a perspective view of a cylindrical ceramic body, FIG. 1b being a cross-sectional view of the cylindrical ceramic body with a concave surface formed at each end thereof, FIG. 2 is a perspective view of a terminal pin, and FIG. 3 is a fragmentary sectional view of a capacitor arrangement according to the prior art;

FIG. 4 is a perspective view of a ceramic capacitor arrangement according to one embodiment of the present invention;

FIG. 5 is a cross-sectional view taken along an axis of the capacitor arrangement shown in FIG. 4;

FIG. 6 is a perspective view of a ceramic body employed in the capacitor arrangement of FIG. 4;

FIG. 7 is a perspective view of a ceramic capacitor arrangement according to another embodiment of the present invention;

FIG. 8 is a cross-sectional view taken along an axis of the capacitor arrangement shown in FIG. 7; and FIG. 9 is a perspective view of a ceramic body employed in the capacitor arrangement of FIG. 7.

DETAILED DESCRIPTION OF THE INVENTION

Referring to FIG. 4, a reference numeral 11 designates a cylindrical ceramic body, reference numerals 12 and 13 designate electrode films deposited on opposite ends of the ceramic body 11, and reference numerals 14 and 15 designate terminal pins extending axially outwards from the opposite ends of the ceramic body 11, respectively.

The body 11 is made of dielectric material, such as, ceramics containing $BaTiO_3$. The body 11 is first sintered and then machined in a shape of cylinder. A socket is formed at each end of the cylindrical ceramic body 11 for receiving and temporarily holding the corresponding terminal pin. According to the embodiment shown in FIGS. 4 to 6, the sockets at opposite ends of the ceramic body 11 are defined by recesses 16 and 17 (FIG. 5), each being tapered in a direction axially inwardly of the body 11.

The electrode films 12 and 13 are deposited on the opposite ends of the ceramic body 11 in the following steps. First, an electrode film made of Ni or Ag is deposited on the entire surface of the ceramic body 11 including the recesses 16 through a known method, such as an electroless plating, a deposition or a painting. Then, the electrode film on the cylindrical side surface of the body 11 is removed by the step of grinding. For example, the grinding can be carried out by the use of a coreless grinding machine (not shown) having a pair of juxtaposed grinding rolls. During the grinding, the ceramic body 11 itself can be grinded to adjust the diameter of the body 11 so as to adjust the capacitance between the electrode films 12 and 13.

According to the present invention, each of the recesses 16 and 17 is formed in such a shape that the diameter of the recess at its opened end is greater than the diameter of the terminal pin, while the diameter at bottom end of each recess, i.e., the end of the recess remote from the opened end, is smaller than the diameter of the terminal pin. Therefore, when the terminal pin is pushed into the corresponding recess, it can be pressure-fitted into the recess to temporarily support the terminal pin thereat.

After the terminal pins 14 and 15 have been temporarily supported in the recesses 16 and 17, respectively, a solder bead 18 is deposited on each of the electrode films 12 and 13 to secure the terminal pins 16 and 17 rigidly in position. Since the terminal pins 14 and 15 are temporarily held in the recesses 16 and 17, respectively, the deposition of the solder bead 18 can be carried out through a method of dipping. Accordingly, the step for manufacturing the capacitor arrangement according to the present invention can be simplified.

Since the terminal pins 16 and 17 are temporarily held in the corresponding recesses, they will not be detached from the body 11 during the manufacture thereof, or when the terminal pins are soldered to a circuit board, i.e., when the terminal pins are applied with heat. Accordingly, it is not necessary to apply a synthetic resin coating around the capacitor arrangement of the present invention. Thus, a high quality capacitor arrangement having no floating capacitance and no deterioration in the temperature characteristics of electrostatic capacitance can be obtained.

Referring to FIGS. 7 to 9, there is shown another embodiment of capacitor arrangement according to the present invention. According to this embodiment, the sockets located at the opposite ends of the ceramic body 11 are defined constituted by elongated grooves 16' and 17', each extending in a direction perpendicular to the axle of the body 11 and being defined by a pair of opposite walls. The distance between the walls is narrowed axially inwardly of the body 11 such that the distance between the walls at the opened side of the groove, i.e., a side in flush with the end surface of the body 11, is greater than the diameter of the terminal pin, and that at the bottom side is smaller than the diameter of the terminal pin. Accordingly, the terminal pin can be pressure-fitted into the corresponding recess to temporarily support the terminal pin thereat.

It is to be noted that the configuration of the ceramic body 11 is not limited to the cylinder, but can be any other elongated body, such as one having a triangular cross-section or rectangular cross-section.

Although the present invention has been fully described with reference to preferred embodiments, many modifications and variations thereof will now be apparent to those skilled in the art, and the scope of the present invention is therefore to be limited not by the details of the preferred embodiment described above, but by the terms of the appended claims.

What is claimed is:

1. A ceramic capacitor arrangement, comprising:
    a substantially axially elongated body shaped as a cylinder, made of a ceramic material and having opposite ends, first and second sockets formed at opposite ends of said elongated body, respectively, each of said sockets being narrowed in a direction axially inwardly of the body;
    first and second electrode films deposited on said opposite ends, respectively;
    first and second terminal pins each having a straightened portion pressure-fitted into said first and second sockets, respectively; each of said end portions being of uniform cross-section along the length thereof; and
    first and second solder beads deposited on opposite ends of the elongated body, respectively, in intimate contact with said pins and said electrode films.

2. A ceramic capacitor arrangement as claimed in claim 1, wherein each of said sockets is defined by a substantially elongated groove extending in a direction perpendicular to an axis of said elongated body, said groove being defined by a pair of opposite walls, said walls being narrowed axially inwardly of said body.

3. A ceramic capacitor arrangement as claimed in claim 1, wherein each of said sockets is defined by a tapered recess.

4. Process for forming a ceramic capacitor arrangement, comprising the steps of:
    providing a substantially axially elongated body made of a ceramic material and having opposite ends;
    forming first and second sockets at opposite ends of said elongated body, respectively, each of said sockets being narrowed in a direction axially inwardly of the body;
    depositing first and second electrode films on said opposite ends, respectively;
    pressure fitting first and second terminal pins into said first and second sockets, respectively;
    depositing first and second solder beads on opposite ends of said elongated body, respectively, in intimate contact with said pins and said electrode films.

5. A method as claimed in claim 4, wherein said elongated body is formed in a shape of a cylinder.

6. A method as claimed in claim 4, wherein said sockets are formed in the shape of a substantially elongated groove extending in a direction perpendicular to an axis of said elongated body, said groove being defined by a pair of opposite walls, said walls being narrowed axially inwardly of said body.

7. A method as claimed in claim 4, wherein each of said sockets is defined by a tapered recess.

* * * * *